Sept. 14, 1948. D. L. STRUBLE 2,449,092
SCRAPING IMPLEMENT
Filed July 26, 1947
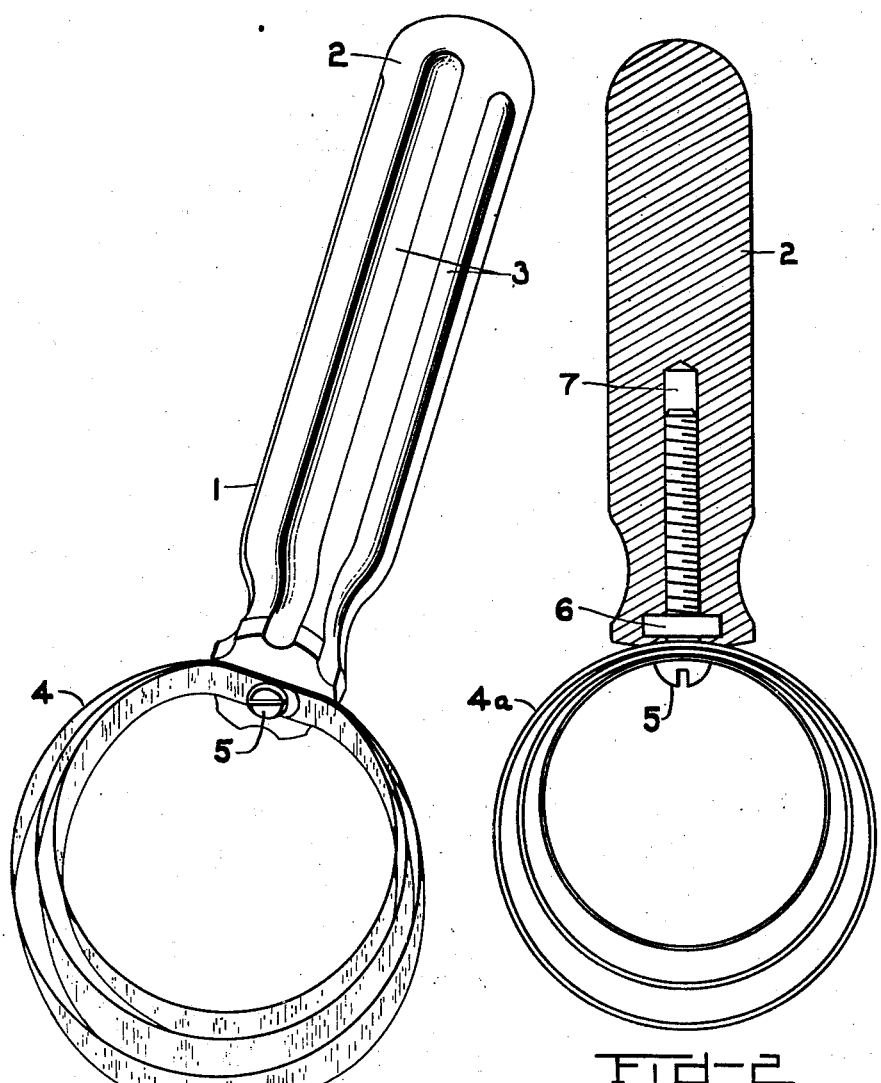
INVENTOR
Donald L. Struble
BY Roy A. Plant
ATTORNEY Patented Sept. 14, 1948

2,449,092

UNITED STATES PATENT OFFICE 2,449,092

SCRAPING IMPLEMENT

Donald L. Struble, Marshall, Mich.

Application July 26, 1947, Serial No. 763,865

2 Claims. (Cl. 15—236)

The present invention relates broadly to tools, and in its specific phases to a scraper suitable for use in removing bone dust from the face of meat cut on a power saw.

Steaks, roasts, et cetera, according to long standard practice, were cut in the past by first using a knife to cut the meat down to the bone following which a hand operated saw was used to sever the bone. By cutting beef in this way, there was little if any suet spread over the cut face of the meat, and the bone dust was moderately coarse so as to facilitate its removal by wiping with a rag. With the advent of power driven meat saws of the electrically operated band saw type, the cutting of meat was revolutionized so that now a complete cut of both meat and bone can be made at one time with the saw. In the cutting of beef this not only smears any suet, through which the cut is made, over the cut face of the meat, but also produces fine bone dust which is also deposited on the cut face of the meat. This suet and bone dust is difficult to more than partially wipe with a rag from the cut face of the meat, and not only is the standard practice of using a rag for this purpose unsanitary and unsatisfactory to the meat cutter, but there is enough suet and bone dust left on the cut face of the meat, after wiping, to make it turn off-color in a few hours, even though enough of the suet and bone dust has been wiped off to make the meat initially look satisfactory. This smearing of fat and bone dust over the cut surface of the meat is not limited to beef, but is equally objectionable with other meats, such as lamb, pork, et cetera. It was a recognition of this problem under actual working conditions, and the lack of anything on the market to meet the requirements of removing the cuttings from the meat, which lead to the conception and development of the present invention.

Accordingly among the objects of the present invention is the provision of a scraper suitable for scraping smeared fat and bone dust from the cut face of meat.

Another object is to provide a meat scraper which has relatively level, and moderately thin, edges for scraping over the surface to be cleaned.

Another object is to provide a meat scraper which may be used either face up.

Another object is to provide a scraper which has a ring type scraping means, the scraping edge of which is thin and relatively level.

A further object is to provide a scraper which has multiple scraping edges which are moderately spaced apart, thin, and substantially in a common plane.

A further object is to provide a scraper assembly having a handle on which is mounted a moderately rigid but flexible, smooth edge, scraping member formed from thin strip material.

A still further object is to provide a scraper assembly having a handle on the end of which is mounted a coiled, smooth edge, thin and flexible, resilient strip material scraping member, with the coils gripped together at the point of joinder to the handle, and spaced apart opposite the point of joinder to form multiple scraping surfaces.

A still further object is to provide an efficient scraper assembly particularly designed for use on meat, said assembly being simple and easy to manufacture as well as use.

Still further objects and advantages of the present invention will appear as the description proceeds.

To the accomplishment of the foregoing and related ends, the invention, then, consists of the scraper means hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing—

Figure 1 shows a perspective view of a preferred form of the present invention.

Figure 2 shows a partially sectioned fragmentary top view of a modified form of the present invention.

Referring more particularly to Figure 1 of the drawing, it will be noted that the scraper assembly 1 has a handle 2 which is of a suitable size for convenient holding in the operator's hand. To stabilize the assembly against rotation under conditions of use, the surface of the handle is preferably provided with longitudinal grooves or flutes 3. In order to prevent endwise slippage from the user's hand, these grooves preferably terminate short of the free end of the handle, while the latter is reduced in size to form a circumferential groove adjacent the other end so that the operator's thumb and first finger can firmly grasp same at this point.

In order to mount the scraping blade means 4 on the handle, a bolt 5 is used, and to give it a firm connection with the handle, the latter is provided with a suitable nut 6, Figure 2, which may be either pressed into a suitable recess in the end of the handle, or placed therein during the forming of the handle when same is cast of hard rubber, plastic material, or the like. A longitudinal passageway 7 on the axis of the handle is provided so that bolt 5 may pass down same when the scraping blade means 4 is being tightened in place. If desired, this passageway may be formed with threads fitting the threads of bolt 5, and in that case, if desired, nut 6 may be omitted. It has been found in actual practice that by tightening bolt 5 onto the handle through the use of a nut 6, and a tight fitting passageway 7, the assembly is held firmly in place under conditions of use. If desired, a suitable cement may be placed on the threads of bolt 5, and a small amount inserted into the opening for the bolt. This will adhesively anchor the bolt in place and still more positively fasten the scraping blade means onto the handle.

If desired, the scraping blade means, as diagrammatically illustrated in Figure 2, may be in the form of three separate rings 4a which may be of continuous form or of separate strips punched at each end so that they may be threaded onto the bolt 5 to form, in either case, offset nesting rings. To keep these rings from independently rotating on bolt 5, it is preferable to spot weld or braze same together so that they operate as a unit.

In preferred construction, as shown in Figure 1, the scraping blade means is in the form of a continuous smooth edged relatively stiff but flexible thin strip which is suitably perforated at spaced intervals for mounting on bolt 5 to form a spiral assembly, or the like, which is offset sidewise against the end of the handle to form a multiplicity of spaced scraping edges 8 opposite the anchored edge of the spiral. The scraping blade, whether in the form of a spiral or nested rings, is preferably made from strip stock similar to clock spring material. In preferred construction, this strip stock is either made of rust proof material, or from material which has been rust proofed so as to be free from contaminating the meat with rust particles.

A preferred form of the present invention, such as is shown in Figure 1, has a plastic handle which is approximately 5 inches long, and 1¾₆ inches in diameter with a circumferential groove at the scraping end and six longitudinal flutes. The scraping blade is formed from strip stock approximately ⁷⁄₁₆ inches wide and ¹⁄₆₄ of an inch thick, the whole being coiled to form rings of approximately 2½, 2¹³⁄₁₆, and 3⅛ inch diameters. Bolt 5, which is used for anchoring this spiral coil scraping blade 4 on handle 2, is preferably rust proofed and of the round head type ¼ inch in diameter and 2 inches long. This construction is strong and gives suitably spaced scraping edges which are in a common plane and smooth so as to do a clean scraping job while remaining flexible, thus facilitating scraping either frozen or unfrozen meat which has been cut either by hand or by means of a power saw.

Other modes of applying the principle of my invention may be employed instead of those explained, change being made as regards the apparatus herein disclosed, provided the means stated by any of the following claims or the equivalent of such stated means be employed.

I therefore particularly point out and distinctly claim as my invention:

1. A meat scraper including a plurality of nested loops of highly resilient strip material increasing in diameter from the innermost loop outwardly, a handle projecting radially from the outermost loop, and means passing through said loops and extending axially into said handle and engaging therein, said means acting to clamp said loops together and pressing said loops together while simultaneously affixing them to the handle, said loops being free for independent edgewise movement except at their points of engagement by said means.

2. A meat scraper including a plurality of nested loops of highly resilient strip material increasing in diameter from the innermost loop outwardly, a handle projecting radially from the outermost loop, and means passing through said loops and extending axially into said handle and engaging therein, said means acting to clamp said loops together and pressing said loops together while simultaneously affixing them to the handle, said loops being free for independent edgewise movement except at their points of engagement by said means, said loops being formed from a single length of spirally wound material.

DONALD L. STRUBLE.

REFERENCES CITED

The following references are of record in the file of this patent:

UNITED STATES PATENTS

| Number | Name | Date |
| --- | --- | --- |
| 167,189 | Nason | Aug. 31, 1875 |
| 629,768 | Campbell | Aug. 1, 1899 |
| 905,653 | Connelly | Dec. 1, 1908 |
| 2,318,273 | Werme | May 28, 1942 |

FOREIGN PATENTS

| Number | Country | Date |
| --- | --- | --- |
| 415,684 | Great Britain | Aug. 30, 1934 |